2,923,223

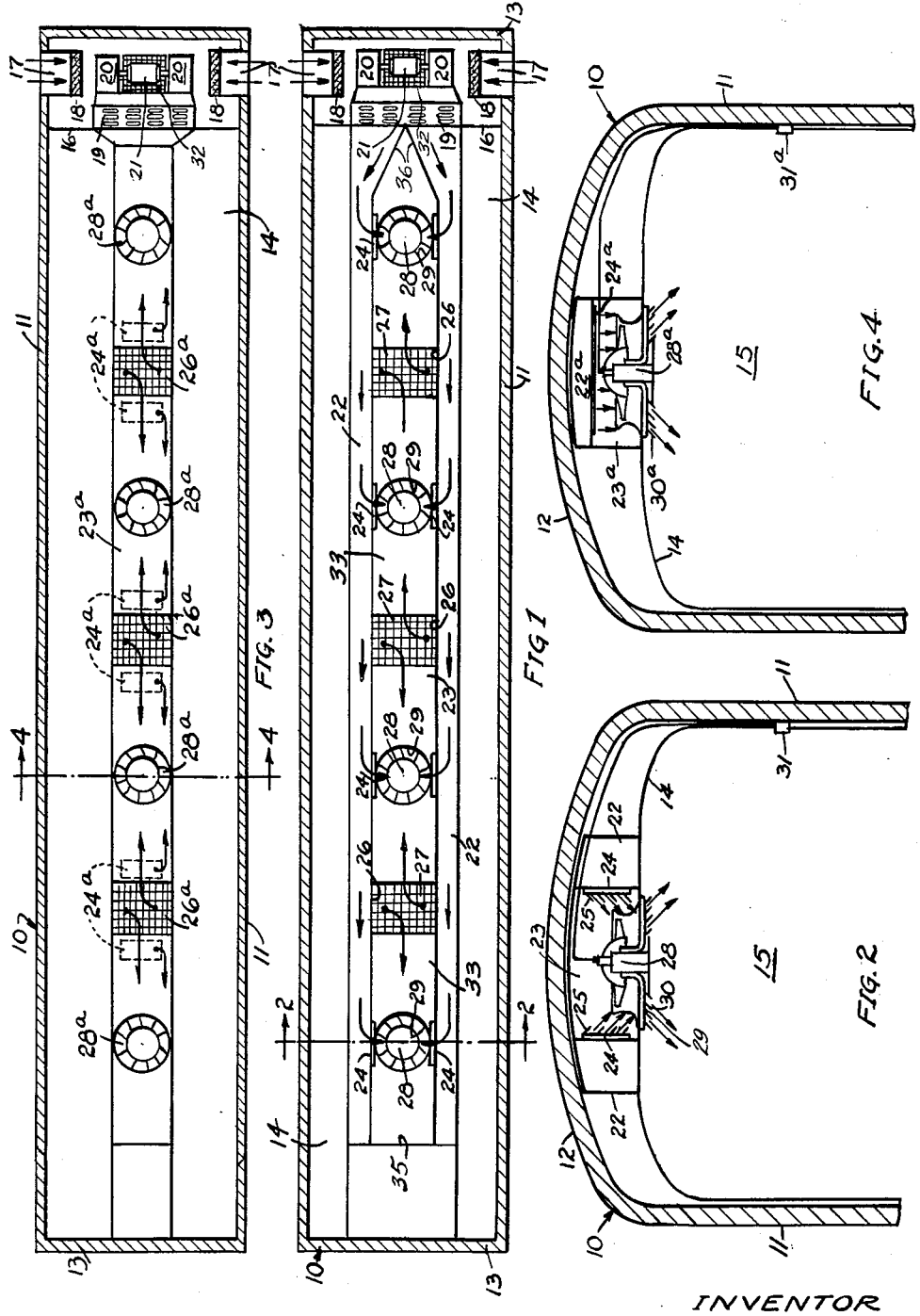

VEHICLE AIR CONDITIONING AND DISTRIBUTING APPARATUS

Wilfrid Fall, Worcester, Mass., assignor to Pullman Incorporated, a corporation of Delaware Application August 20, 1956, Serial No. 605,143

3 Claims. (Cl. 98—10)

This invention relates to an air conditioning system for a vehicle having a passenger compartment and particularly adapted for use in mass transportation vehicles.

The invention relates more particularly to an air conditioning system of the type utilizing refrigeration for use in a mass transport vehicle and having means for positively circulating air in the vehicle to supplement the refrigeration system.

The present invention contemplates an air conditioning system for mass transportation vehicles wherein a refrigeration system is utilized at a constant capacity to provide conditioned air and providing varying degrees of cooling comfort by varying the circulation of air within the vehicle and controlling the circulation in accordance with air conditions in the vehicle.

The principal object of the invention is the provision of an air conditioning system for commuter type passenger vehicles where entrance and exit doors are opened at frequent intervals.

An important object of the invention is the provision of an air conditioning system for commuter type passenger vehicles adapted to afford maximum cooling comfort regardless of passenger density.

Another object of the invention is the provision of an air conditioning system for commuter type vehicles adapted to provide conditioned air for a normal passenger load and automatically to compensate for increased passenger loads by increased circulation of air in the vehicle.

A more specific object of the invention is the provision of air distributing apparatus for an air conditioned passenger vehicle including a conditioned air duct in communication with air conditioning equipment, a mixed air duct in communication with the conditioned air duct and positive circulating fans discharging air from the mixed air duct to the vehicle.

The primary object of the invention to provide an air conditioning system having refrigeration capacity for normal passenger requirements which is supplemented by increased air circulation upon increased passenger requirements.

The foregoing and other objects of the invention are attained by the structure and arrangement illustrated in the accompanying drawings wherein—

Fig. 1 is a plan view of a rapid transit type passenger vehicle equipped with the air conditioning and distributing apparatus of this invention.

Fig. 2 is a transverse sectional view through a portion of the vehicle taken on the line 2—2 of Fig. 1.

Fig. 3 is a plan view similar to Fig. 1 but showing a modified arrangement of the air distributing ducts; and Fig. 4 is a transverse sectioned view similar to Fig. 2 taken on the line 4—4 of Fig. 3.

In this system of air conditioning fresh air is drawn from outside the vehicle, cooled by evaporator coils and delivered through a longitudinally extending conditioned air duct into a mixed air duct extending in parallel relation to the conditioned air duct. Air distribution fans having variable speed thermostatically controlled in accordance with temperative conditions in the passenger space discharge air from the mixed air duct to the space. Recirculated air from the passenger space enters the mixed air duct directly through grilles where it is mixed with conditioned fresh air and is discharged again into the passenger space. Exhaust of air from the passenger space will be sufficient through the natural loss around doors and because in vehicles of the type on which this system is used the doors are opened frequently so that the static pressure in the car will not build up to the point where the efficiency of the fans may be materially reduced. A primary advantage of this system is that it provides adequate conditioning of the air to afford comfort for the passengers during peak loads with minimum equipment capacity. The air conditioning equipment is of a size designed for the normal passenger load and thermostatic control of the speed of the fans causes increased speed of the fans and the resulting higher velocity movement of the air when the passenger load increases serves as a further aid to passenger comfort. The air conditioning equipment dehumidifies all air entering the system to be conditioned and this is of particular importance and value in vehicles operating in tunnels and subways where the relative humidity is high.

In the drawings 10 represents a rapid transit type commuter vehicle having side walls 11, a roof 12 and end walls 13. Vehicles of this type are provided with a plurality of entrance doors in the side walls which are opened frequently at successive stations on the line of operation. Ordinarily this frequent opening of the doors has created a problem in the air conditioning of cars of this type and heretofore large capacity air conditioning systems have been tried but these installations were expensive, consumed excessive amounts of passenger space and generally proved unsatisfactory. Forced air ventilating systems also have been used but have fallen short of being fully effective when applied to vehicles of this type handling large numbers of passengers and where station stops and door operations occur at frequent intervals.

The vehicle 10 contains passenger space 15 and a ceiling 14 is disposed over this space and located beneath the roof 12. Above the ceiling a cross partition 16 defines a space at one end of the car where air to be conditioned is drawn in. Openings 17 afford access to this space of fresh air from the outside which is filtered as it is drawn in through filters 18. An evaporator 19 is located in this overhead space for cooling the air drawn in to be conditioned and is operatively connected with refrigeration equipment (not shown) of a type commonly used on railway passenger vehicles. The refrigeration equipment includes a compressor and condenser in circuit with the evaporator. Blowers 20 operated by a motor 21 draw in the air to be conditioned and move it through the evaporator to cool and dehumidify the air for discharge into the passenger space.

A pair of ducts 22 are associated with the evaporator 19 to receive the cooled air discharged therefrom and extend longitudinally of the vehicle substantially full length of the passenger compartment 15 and are located over the ceiling 14. The ducts 22 comprise conditioned air ducts and are spaced apart transversely of the vehicle to define a passage 23 coextensive with the conditioned air ducts. The passage is defined by a bottom wall 33, a top wall 34, one end wall 35, and at the opposite end by the convergence of the duct side walls 36. The passage 23 is a mixed air duct into which the conditioned air from the ducts 22 is discharged through the inside walls of the ducts by means of outlets 24 which are disposed in opposed relation as best shown in Fig. 1. Adjustable grilles 25 are utilized at the outlets 24 to regulate the amount of air discharged into the mixed air duct at the various points throughout the length of the ducts, Recirculated air inlet openings 26 having grilles 27 are located in the bottom wall of the mixed air duct opening through the ceiling 14 for the admission of air from the passenger compartment to be mixed with the conditioned air discharged from the ducts 22 and recirculated into the passenger compartment.

The air from the mixed air duct 23 is discharged to the passenger compartment by axial flow air distributing fans 28 which discharge through openings 29 in the bottom wall of the duct. These fans are of the variable speed type of well known form utilizing conventional parts for controlling the fan speed in accordance with temperature conditions in the passenger compartment by means of conventional thermostatic controls which may be set in accordance with the conditions to be maintained in the passenger compartment. Directional vanes 30 at the discharge openings disseminate the air and avoid direct drafts. The distributing fans 28 and discharge openings 29 are located transversely between the opposed discharge outlets 24 from the ducts 22 so that at the initial speed of the fans substantially all of the air delivered into the passenger compartment may come from the conditioned air ducts 22 through the outlets 24 at directly opposite sides of the respective fans. The recirculated air inlet openings 26 in the bottom wall of the mixed air duct 23 are disposed in spaced relation and located at points longitudinally spaced from the locations of the inlets 24 and fans 28 as shown in Fig. 1. Where a greater intermingling of the conditioned air from ducts 22 and the recirculating air from the openings 26 may be desired the inlet openings 24 could be located more closely adjacent to the openings 26 whereby the combined air streams from the respective openings would have to travel a greater distance in the mixing duct 23 to the distributing fans 28. An arrangement of this kind is indicated in Fig. 3, hereinafter to be described.

In the operation of this system the blowers 20 move the conditioned air through the twin ducts 22 substantially the entire length of the vehicle where it is released into the center mixing duct 23 through the openings 24 and with a normal load of seated passengers the speed of the air distributing fans 28 is such that this volume of conditioned air will be discharged directly through the fans into the passenger compartment. Upon the ingress of additional passengers the temperature and humidity of the air in the passenger compartment will rise proportionately due to the additional load from the standee passengers whereupon the speed of the distributing fans will automatically be increased by the controls hereinabove referred to and thus provide additional circulation of air and thereby compensate for the increased passenger load. In these circumstances the additional air for this increased circulation is drawn from the passenger compartment through the recirculated air inlets 26, mixed with the conditioned air discharged from ducts 22 and the mixed air distributed to the passenger compartment by the fans 28. The distributing fans 28 are thermostatically controlled in accordance with air conditions in the passenger compartment to vary the speed thereof automatically in accordance with those conditions. Thermostat 31 mounted in the passenger compartment is operatively connected in circuit with the fans in a well known manner through suitable controls which may be conventional, and adapted to vary the speed of the fan motors in accordance with the settings of the thermostat. The air conditioning system is designed to operate at a constant capacity while the capacity of the air distributing apparatus is designed to vary according to the passenger load as reflected by the thermostat settings controlling the fan speeds.

The refrigeration system is designed to provide air conditioning for a normal passenger load and is supplemented by the increasing capacity of the air distributing apparatus during peak passenger loads so that the system as a whole provides full comfort conditions for the passengers at all times without the necessity of added equipment of excessive capacity. With a normal passenger load the air conditioning equipment will provide the comforts of full temperature control air conditioning, which, on the basis of a twenty-four hour operating schedule, obtains from fifty percent to ninety percent of the time. Under the most crowded conditions of the vehicle during peak periods of traffic the forced air distribution in the passenger compartment will provide full comfort to the passengers by the air movement and which will always be cooler and dryer than the outside air. Under some conditions of service it may be desirable to provide for the admission of recirculated air to the overhead chamber housing the evaporator 19. This arrangement would be applicable to vehicles which may operate in subways and tunnels where the outside air is dirty and less suited for conditioning than the air inside the car. For this purpose a recirculated air grille 32 may be located in the ceiling under the evaporator and blowers. This would also increase the quantity of air passing over the evaporator which would aid in preventing the frosting of the coil and avoid reducing its efficiency. With this arrangement manually pre-set dampers (not shown) can be included in the system to apportion the amount of outside air in relation to the amount of recirculated air most suitable for use on any particular route over which the vehicle may operate.

A modification of the duct arrangement is illustrated in Figs. 3 and 4. In this arrangement a single conditioned air duct 22a is disposed centrally of the vehicle and extends longitudinally of the vehicle substantially full length of the passenger compartment 15. A mixed air duct 23a coextensive with the duct 22a is located directly under the conditioned air duct. Both ducts are disposed in the space between the vehicle roof 12 and the ceiling 14. The conditioned air duct 22a discharges directly into the lower mixing duct 23a through outlet grilles 24a in the bottom wall thereof. As best shown in Fig. 3, the outlet grilles 24a have been indicated as located more closely adjacent to the recirculated air inlets 26a whereby the respective air streams entering the duct 23a will be caused to commingle throughout the thus greater length of travel of the combined streams to the fans 28a. Distributing fans 28a discharge the air from the mixing duct through directional vanes 30a into the passenger compartment and the mixing duct is provided with recirculated air inlets 26a in its bottom wall for admitting air from the passenger compartment and these inlets are disposed in longitudinally spaced relation to the distributing fans 28a. The speed of fans 28a is controlled automatically by thermostat 31a and the operation of the system as a whole is the same with this arrangement as with the embodiment previously described.

From the foregoing it will be seen that there has been provided an air conditioning system especially adapted for use in commuter type passenger vehicles where entrance doors are opened at frequent intervals and which affords maximum cooling comfort to passengers at all times regardless of the density of the passenger load and wherein air conditioning capacity is provided for normal passenger loads and increased passenger loads are compensated for by providing additional air circulation in combination with the continued conditioning of the air.

What is claimed is:

1. In a vehicle having a passenger compartment, an air conditioning and distributing apparatus comprising air conditioning mechanism having an inlet connected to the outside of said vehicle for admitting air to be conditioned to said mechanism, a pair of longitudinal ducts disposed in spaced relation above the level of said compartment for receiving conditioned air from said mechanism and extending from said mechanism over the passenger compartment, blower means for discharging conditioned air into said ducts, an aligned mixing duct substantially coextensive with the conditioned air ducts disposed in the space between and parallel to the conditioned air ducts, means admitting air from the conditioned air ducts into said mixing duct comprising spaced openings in opposed relation in the side walls of the ducts, said mixed air duct having means for admitting recirculated air thereto from the passenger compartment comprising inlet openings in the bottom wall of the mixing duct in longitudinally spaced relation to said openings in said side walls, and a plurality of axial flow air distributing fans in the mixing duct supported overhead of said compartment in the space between the conditioned air ducts and having discharge openings extending through the bottom wall of the mixed air duct for discharging mixed conditioned and recirculated air from said mixing duct, said fans being spaced longitudinally from the openings in the bottom and side walls of the mixing duct, said conditioned air openings being more closely adjacent to said fans than said recirculated air openings.

2. In an enclosure to be conditioned, an air conditioning mechanism having an inlet connected to the outside of said enclosure for admitting air to said mechanism to be conditioned, apparatus for distributing conditioned air to the enclosure comprising a conditioned air duct above the level of said enclosure for receiving conditioned air from said mechanism and extending from said mechanism over the enclosure, an aligned mixed air duct disposed parallel to and substantially coextensive with said conditioned air duct for receiving air discharged from the conditioned air duct, a plurality of spaced openings providing communication between said ducts through which the air is supplied from the conditioned air duct to the mixed air duct, a plurality of recirculated air inlets in said mixed air duct longitudinally spaced from said openings for admitting air from the enclosure, a plurality of distributing fans having discharge outlets spaced from said inlets and located more closely adjacent to said openings than to said inlets, said outlets extending through the bottom wall of said mixed air duct for discharging air downwardly from the mixed air duct into the enclosure, and means including a thermostat responsive to air conditions in the enclosure for regulating the speed of said fans.

3. In an air conditioning system for a space to be conditioned, an air conditioning mechanism having an inlet connected to the outside of said space for admitting air to be conditioned to the mechanism, apparatus for discharging a constant quantity of conditioned air from said mechanism, a conditioned air chamber connected to said mechanism for receiving conditioned air from the mechanism, an opening for discharging conditioned air from said chamber, a mixed air chamber adjoining said conditioned air chamber for receiving air discharged through said opening from said conditioned air chamber, said mixed air chamber adjoining said space and having an opening for admitting recirculating air from said space into the mixed air chamber, said recirculating air intermingling with the conditioned air in said mixed air chamber, a continuously operating distributing fan in said mixed air chamber and having a discharge outlet extending into said space for discharging mixed conditioned and recirculated air from said mixed air chamber into said space, said fan and discharge outlet spaced from said openings, said conditioned air opening being more closely adjacent to said fan than said recirculated air opening, and means including a thermostat responsive to air conditions in said space for regulating the speed of said fan thereby varying the circulation of air in said space in accordance with the air conditioning in said space.

References Cited in the file of this patent

UNITED STATES PATENTS

| | | |
|---|---|---|
| 2,123,076 | Madden | July 5, 1938 |
| 2,155,632 | Anderson | Apr. 25, 1939 |
| 2,166,906 | Henney | July 18, 1939 |
| 2,199,341 | Henney | Apr. 30, 1940 |
| 2,241,579 | Bergstrom | May 13, 1941 |
| 2,258,565 | Bergstrom | Oct. 7, 1941 |
| 2,273,000 | Hans | Feb. 10, 1942 |
| 2,277,045 | Hanson | Mar. 24, 1942 |
| 2,340,252 | Palmer | Jan. 25, 1944 |
| 2,422,560 | Palmer | June 17, 1947 |
| 2,422,782 | Hemming | June 24, 1947 |
| 2,673,512 | Henney | Mar. 30, 1954 |